No. 893,680.  
PATENTED JULY 21, 1908.  
L. S. WATRES.  
SHOCK ABSORBER.  
APPLICATION FILED JUNE 26, 1907.
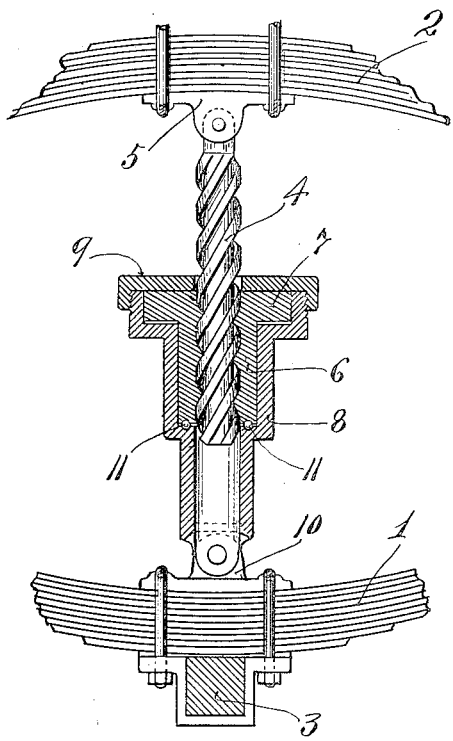
Witnesses.  
A. H. Opsahl.  
L. L. Simpson
Inventor.  
Lewis. S. Watres.  
By his Attorneys  
Williamson Merchant

UNITED STATES PATENT OFFICE.

LEWIS S. WATRES, OF SCRANTON, PENNSYLVANIA.

SHOCK-ABSORBER.

No. 893,680.  Specification of Letters Patent.  Patented July 21, 1908.

Application filed June 26, 1907. Serial No. 380,863.

*To all whom it may concern:*

Be it known that I, LEWIS S. WATRES, a citizen of the United States, residing at Scranton, in the county of Lackawanna and State of Pennsylvania, have invented certain new and useful Improvements in Shock-Absorbers; and I do hereby declare the following to be a full, clear, and exact description of the invention, such as will enable others skilled in the art to which it appertains to make and use the same.

My invention has for its object to provide an improved shock absorber for use in connection with springs, or spring cushioned members, and to this end it consists of the novel devices and combinations of devices hereinafter described and defined in the claims.

More particularly stated, the device is especially designed to offer but very slight resistance to the spring compressing or straining force to which the springs are subjected, but which will retard and prevent sudden recoil or reacting movements of such springs.

The device, while capable of wide range of application, is especially adapted for use in connection with automobiles and other vehicles, the supporting springs of which are frequently subjected to sudden strains. The danger of breaking of the springs is not so much due to the compression or cushioning strain as it is due to the recoil or reaction of the spring, and, furthermore, the objectionable jolts or jars to which the passengers of such vehicles are subjected are due almost entirely to the recoil or reaction of said springs.

My invention provides a simple and efficient device for accomplishing the object set forth. The so-called improved shock absorber is illustrated in the single view of drawing, which shows the parts partly in side elevation and partly in vertical section, some parts being broken away. Also as shown in the drawings, the shock absorber is applied between the upper and lower members of an elliptical spring 1—2 of the usual or any suitable construction, the lower member 1, as shown, being attached to and supported by an axle 3.

The improved device preferably comprises a non-rotary threaded plunger 4 which is pivotally connected to a bearing 5 rigidly secured to the intermediate portion of the upper spring member 2. This plunger 4 has threaded engagement with a hub 6 having a projecting flange or disk portion 7. This hub 6 and its disk 7 are rotatively mounted within a non-rotary sleeve 8 having a detachable friction plate or cap 9 with which the disk portion 7 of said hub is adapted to engage under friction. The lower end of the sleeve 8 is shown as pivotally connected to a bearing 10 secured to the intermediate portion of the lower spring member 1 and to the axle 3. The intermediate portion of the sleeve 8 is provided with an internal shoulder 11 that affords a ball runway between which and the lower end of the hub 6 antifriction bearing balls 11 are interposed.

With the construction described, it is evident that when the upper spring member 2 is forced downward by compression or cushioning movement of the spring, the non-rotary threaded plunger 4 will cause the hub 6 and its flange to rotate within the sleeve 8 and that the bearing balls 11 will permit the said hub to rotate under but very slight frictional resistance, so that the device will but very slightly retard or resist such compression or cushioning movement of the said spring. Under recoil of the spring, or upward movement of the upper spring member 2, the said threaded plunger 4 will, of course, cause the hub 6 to rotate in a direction reverse from that just noted, and it will also raise the rotary hub 6 so that the upper face of its friction disk or flange 7 will be tightly pressed against the lower face of the friction plate 9. thereby causing the said hub to rotate under relatively great frictional resistance. This will, of course, very greatly retard the recoil or reaction of the spring. It is also evident that frictional resistance to the rotation of the hub 6 under recoil of the spring will be approximately proportional to the force of the recoil.

It will be further understood that the device described may take different forms, and that it may be applied to springs or associated in connection with springs in various different ways.

The expression "anti-friction bearing balls" is herein used in a sense broad enough to include antifriction bearing rollers.

What I claim is:

1. The combination with a spring, of a shock absorber comprising a pair of non-rotary members and a rotary member, said rotary member having threaded engagement with one of said non-rotary members and having frictional engagement with the other non-rotary member, and anti-friction bearing balls interposed between the said rotary member and the latter noted non-rotary member, and so arranged that under compression or cushioning movements of said spring the said rotary member will be rotated under but slight frictional resistance, while under recoil of said spring the said rotary member will be pressed into engagement with the said latter noted non-rotary member and will be rotated under frictional resistance, substantially as described.

2. The combination with a spring, of a shock absorber comprising a non-rotary threaded plunger, a rotary hub having threaded engagement with said plunger and provided with a frictional surface, a non-rotary sleeve inclosing said rotary hub and having a friction plate engageable with the friction surface of said hub, under recoil of said spring, and antifriction bearing balls interposed between said hub and sleeve, for causing said hub to freely rotate under compression of said spring, substantially as described.

In testimony whereof I affix my signature in presence of two witnesses.

LEWIS S. WATRES.

Witnesses:
MALIE HOEL,
F. D. MERCHANT.